(12) United States Patent
Ono et al.

(10) Patent No.: US 9,203,119 B2
(45) Date of Patent: Dec. 1, 2015

(54) BATTERY DEVICE

(71) Applicant: Seiko Instruments Inc., Chiba-shi, Chiba (JP)

(72) Inventors: Takashi Ono, Chiba (JP); Toshiyuki Koike, Chiba (JP); Satoshi Abe, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 0 days.

(21) Appl. No.: 14/195,252

(22) Filed: Mar. 3, 2014

(65) Prior Publication Data

US 2014/0248514 A1 Sep. 4, 2014

(30) Foreign Application Priority Data

Mar. 4, 2013 (JP) .................. 2013-042149

(51) Int. Cl.
*H01M 10/42* (2006.01)
*H02J 7/00* (2006.01)

(52) U.S. Cl.
CPC ......... *H01M 10/4257* (2013.01); *H02J 7/0029* (2013.01); *H02J 2007/0039* (2013.01)

(58) Field of Classification Search
CPC ............ H02J 7/0029; H02J 2007/0039; H02J 7/0031; H01M 10/4257
See application file for complete search history.

(56) References Cited

U.S. PATENT DOCUMENTS 6,903,533 B1 * 6/2005 Geren et al. .................. 320/134

FOREIGN PATENT DOCUMENTS

JP 2004-104956 A 4/2004

* cited by examiner

*Primary Examiner* — Muhammad Siddiquee
(74) *Attorney, Agent, or Firm* — Brinks Gilson & Lione

(57) ABSTRACT

Provided is a battery device with high safety, which has improved accuracy of overcurrent detection. In the battery device, an overcurrent detection terminal of a battery state monitoring circuit is connected to a node between a discharge control switch and a charge control switch via a resistor.

1 Claim, 3 Drawing Sheets

BATTERY DEVICE

RELATED APPLICATIONS

This application claims priority under 35 U.S.C. §119 to Japanese Patent Application No. 2013-042149 filed on Mar. 4, 2013, the entire content of which is hereby incorporated by reference.

BACKGROUND OF THE INVENTION

1. Field of the Invention

The present invention relates to a battery device for detecting a voltage and an abnormality of a secondary battery.

2. Description of the Related Art

FIG. 3 is a circuit diagram illustrating a related-art battery device. The related-art battery device includes a secondary battery 11, an N-channel discharge control field effect transistor 12, an N-channel charge control field effect transistor 13, a battery state monitoring circuit 14, resistors 22 and 31, a capacitor 32, and external terminals 20 and 21. The battery state monitoring circuit 14 includes a control circuit 15, a discharge overcurrent detection circuit 16, a charge overcurrent detection circuit 116, an overcurrent detection terminal 19, a charge control signal output terminal 41, a discharge control signal output terminal 42, a positive power supply terminal 44, and a negative power supply terminal 43. The discharge overcurrent detection circuit 16 includes a comparator circuit 18 and a reference voltage circuit 17. The charge overcurrent detection circuit 116 includes a comparator circuit 118 and a reference voltage circuit 117.

The control circuit 15 includes resistors 504, 505, 506, 507, and 518, reference voltage circuits 509 and 516, comparator circuits 501, 508, and 514, an oscillator circuit 502, a counter circuit 503, logic circuits 510 and 520, a level shift circuit 511, a delay circuit 512, and NMOS transistors 517 and 519.

Next, an operation of the related-art battery device is described. When a load is connected between the external terminals 20 and 21, and a discharge current flows therethrough, a voltage of the external terminal 21 increases. The discharge current generates voltages between a drain terminal and a source terminal of the N-channel discharge control field effect transistor 12 and between a drain terminal and a source terminal of the N-channel charge control field effect transistor 13, and the total voltage is input to the discharge overcurrent detection circuit 16. When the discharge current is represented by $I_1$, an ON-resistance value of the N-channel discharge control field effect transistor 12 is represented by $R_{12}$, and an ON-resistance value of the N-channel charge control field effect transistor 13 is represented by $R_{13}$, a voltage generated between the negative power supply terminal 43 and the external terminal 21 is expressed by $I_1 \times (R_{12}+R_{13})$. When $I_1 \times (R_{12}+R_{13})$ exceeds an output of the reference voltage circuit 17, the comparator circuit 18 inverts its output and outputs a discharge overcurrent detection signal to the control circuit 15.

A voltage of the overcurrent detection terminal 19 is equal to a voltage of the external terminal 21, and hence, when the discharge overcurrent flows to increase the voltage of the external terminal 21, the voltage $I_1 \times (R_{12}+R_{13})$ of the overcurrent detection terminal 19 increases to be equal to or higher than an output voltage of the reference voltage circuit 516 or an output voltage of the reference voltage circuit 17. Then, an output of the comparator circuit 514, or both outputs of the comparator circuits 514 and 18 are inverted to detect a discharge overcurrent or a short circuit, thereby outputting a signal for turning off the N-channel discharge control field effect transistor 12 to the discharge control signal output terminal 42. In this manner, the discharge overcurrent or the short circuit is detected to protect the battery device from the discharge overcurrent. The output voltage of the reference voltage circuit 17 corresponds to a discharge overcurrent detection voltage, and the voltage of the reference voltage circuit 516 corresponds to a short-circuit detection voltage (see, for example, Japanese Patent Application Laid-open No. 2004-104956).

In the related art, however, when the discharge overcurrent is detected, a battery voltage decreases due to an internal resistance of the battery, and hence there is a problem in that the battery voltage may fall below a minimum operating voltage of the discharge overcurrent detection circuit 16 and the comparator circuit 18 may not operate normally to reduce the safety of the battery device. Further, when the current flows between the external terminals 20 and 21, a gate-source voltage of the N-channel charge control field effect transistor 13 fluctuates to fluctuate the ON-resistance, and hence there is another problem in that the accuracy of the overcurrent detection may be reduced.

SUMMARY OF THE INVENTION

The present invention has been devised in order to solve the problems described above, and provides a battery device with safety, which has improved accuracy of overcurrent detection of a battery state monitoring circuit.

In order to solve the related-art problems, a battery device according to one embodiment of the present invention is configured as follows.

In the battery device, an overcurrent detection terminal of a battery state monitoring circuit is connected to a node between a discharge control switch and a charge control switch via a resistor.

The battery device according to one embodiment of the present invention can decrease an overcurrent detection voltage, thereby being capable of decreasing a minimum operating voltage of an overcurrent detection circuit. Consequently, a malfunction of the overcurrent detection circuit can be prevented to enhance the safety of the battery device. Further, fluctuations in ON-resistance of an N-channel charge control field effect transistor due to an overcurrent can be neglected, and hence the accuracy of overcurrent detection can be enhanced.

DETAILED DESCRIPTION OF THE PREFERRED EMBODIMENTS

Now, embodiments of the present invention are described with reference to the accompanying drawings.

First Embodiment

Figure 1:
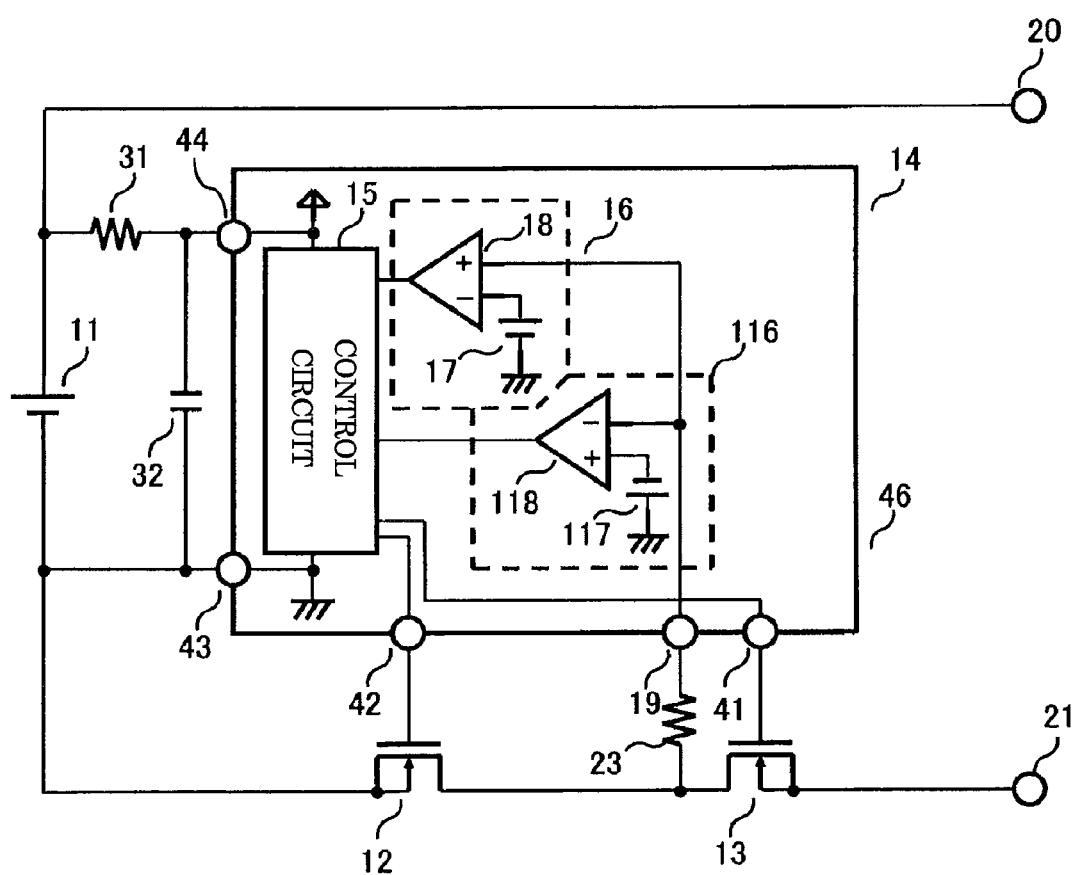
FIG. 1 is a circuit diagram of a battery device according to a first embodiment of the present invention.

FIG. 1 is a circuit diagram of a battery device according to a first embodiment of the present invention.

The battery device according to the first embodiment includes a secondary battery 11, an N-channel discharge control field effect transistor 12, an N-channel charge control field effect transistor 13, a battery state monitoring circuit 14, resistors 23 and 31, a capacitor 32, and external terminals 20 and 21. The battery state monitoring circuit 14 includes a control circuit 15, a discharge overcurrent detection circuit 16, a charge overcurrent detection circuit 116, an overcurrent detection terminal 19, a charge control signal output terminal 41, a discharge control signal output terminal 42, a positive power supply terminal 44, and a negative power supply terminal 43. The discharge overcurrent detection circuit 16 includes a comparator circuit 18 and a reference voltage circuit 17. The charge overcurrent detection circuit 116 includes a comparator circuit 118 and a reference voltage circuit 117.

The secondary battery 11 has a positive electrode connected to the external terminal 20 and the resistor 31, and a negative electrode connected to the capacitor 32, the negative power supply terminal 43, and a source and a back gate of the N-channel discharge control field effect transistor 12. The positive power supply terminal 44 is connected to a node between the resistor 31 and the capacitor 32. The N-channel discharge control field effect transistor 12 has a gate connected to the discharge control signal output terminal 42, and a drain connected to a node between a drain of the N-channel charge control field effect transistor 13 and one terminal of the resistor 23. The other terminal of the resistor 23 is connected to the overcurrent detection terminal 19. The N-channel charge control field effect transistor 13 has a gate connected to the charge control signal output terminal 41, and a source and a back gate connected to the external terminal 21. The comparator circuit 18 has an inverting input terminal connected to one terminal of the reference voltage circuit 17, a non-inverting input terminal connected to the overcurrent detection terminal 19, and an output terminal connected to the control circuit 15. The other terminal of the reference voltage circuit 17 is connected to the negative power supply terminal 43. The comparator circuit 118 has a non-inverting input terminal connected to one terminal of the reference voltage circuit 117, an inverting input terminal connected to the overcurrent detection terminal 19, and an output terminal connected to the control circuit 15. The other terminal of the reference voltage circuit 117 is connected to the negative power supply terminal 43. The control circuit 15 has a first input terminal connected to the positive power supply terminal 44, a second input terminal connected to the negative power supply terminal 43, a first output connected to the charge control signal output terminal 41, and a second output connected to the discharge control signal output terminal 42.

Next, an operation of the battery device according to the first embodiment is described.

When a voltage of the secondary battery 11 is equal to or lower than an overcharge detection voltage and equal to or higher than an overdischarge detection voltage, the N-channel discharge control field effect transistor 12 and the N-channel charge control field effect transistor 13 are controlled to be turned on.

In this state, when a load is connected between the external terminals 20 and 21, and a discharge current flows therethrough, a voltage is generated between the negative electrode of the secondary battery 11 and the drain terminal of the N-channel discharge control field effect transistor 12, and is input to the overcurrent detection terminal 19. This voltage is determined by a current amount $I_1$ of the discharge current and an ON-resistance value $R_{12}$ of the N-channel discharge control field effect transistor 12, and is expressed by $I_1 \times R_{12}$. When the voltage $I_1 \times R_{12}$ input to the overcurrent detection terminal 19 exceeds an output voltage of the reference voltage circuit 17, the discharge overcurrent detection circuit 16 inverts its output and outputs a discharge overcurrent detection signal to the control circuit 15. The control circuit 15 outputs a signal for turning off the N-channel discharge control field effect transistor 12 to the discharge control signal output terminal 42, thereby protecting the battery device from a discharge overcurrent.

When a charger is connected between the external terminals 20 and 21, a charge current with a current amount $I_2$ flows in the direction reverse to that of the discharge current, and a voltage expressed by $I_2 \times R_{12}$ is input to the overcurrent detection terminal 19. When $I_2 \times R_{12}$ falls below an output voltage of the reference voltage circuit 117, the charge overcurrent detection circuit 116 inverts its output and outputs a charge overcurrent detection signal to the control circuit 15. The control circuit 15 outputs a signal for turning off the N-channel charge control field effect transistor 13 to the charge control signal output terminal 41, thereby protecting the battery device from a charge overcurrent.

The voltage to be input to the overcurrent detection terminal 19 when the load is connected is determined only by the current amount $I_1$ of the discharge current and the ON-resistance value $R_{12}$ of the N-channel discharge control field effect transistor 12. Thus, even when a potential difference between the negative power supply terminal 43 and the overcurrent detection terminal 19 is small, the discharge overcurrent can be detected. In other words, the discharge overcurrent detection circuit 16 can be designed to have a low minimum operating voltage. In this manner, even when the battery voltage decreases due to an internal resistance of the battery at the time of the discharge overcurrent detection, the discharge overcurrent detection circuit 16 can be operated normally to enhance the safety of the battery device.

Further, both the discharge overcurrent detection and the charge overcurrent detection can be performed without using the ON-resistance of the N-channel charge control field effect transistor 13, and hence the flow of the overcurrent has no effect on fluctuations of the ON-resistance of the N-channel charge control field effect transistor 13. Consequently, the overcurrent can be detected with high accuracy.

Note that, the description has been given by using the configuration in which the overcurrent is detected by connecting the resistor to the drains of the N-channel charge control field effect transistor 13 and the N-channel discharge control field effect transistor 12. However, the present invention is not limited to this configuration, and may employ any configuration as long as the overcurrent can be detected from the drain of the N-channel discharge control field effect transistor 12.

As described above, the overcurrent is detected only by the ON-resistance of the N-channel discharge control field effect transistor 12, and hence the minimum operating voltage of the comparator circuit 18 can be set to be low, and, even when the battery voltage decreases due to the internal resistance of the battery at the time of the discharge overcurrent detection, a malfunction of the discharge overcurrent detection circuit 16 can be prevented to enhance the safety of the battery device. Further, the ON-resistance of the N-channel charge control field effect transistor 13 is not used, and hence the flow of the overcurrent has no effect on fluctuations of the ON-resistance of the N-channel charge control field effect transistor 13. Consequently, the overcurrent can be detected with high accuracy.

Second Embodiment

Figure 2:
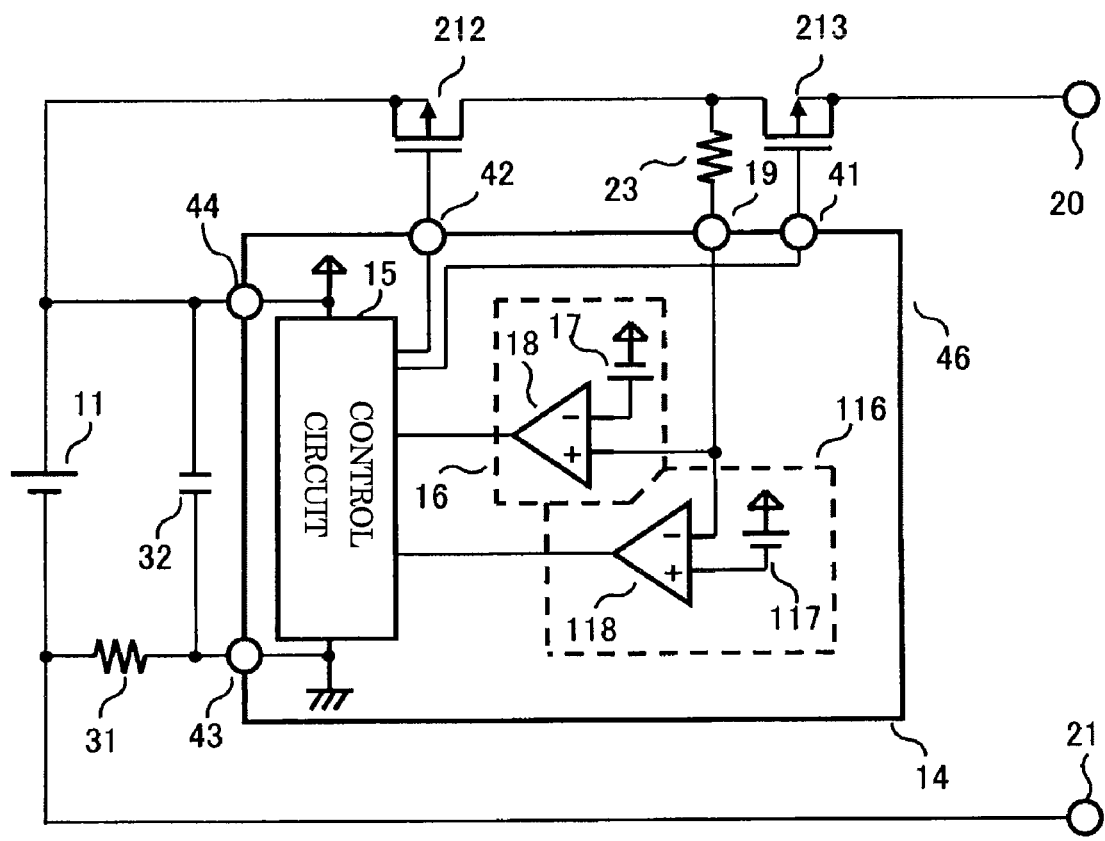
FIG. 2 is a circuit diagram of a battery device according to a second embodiment of the present invention.
Figure 3:
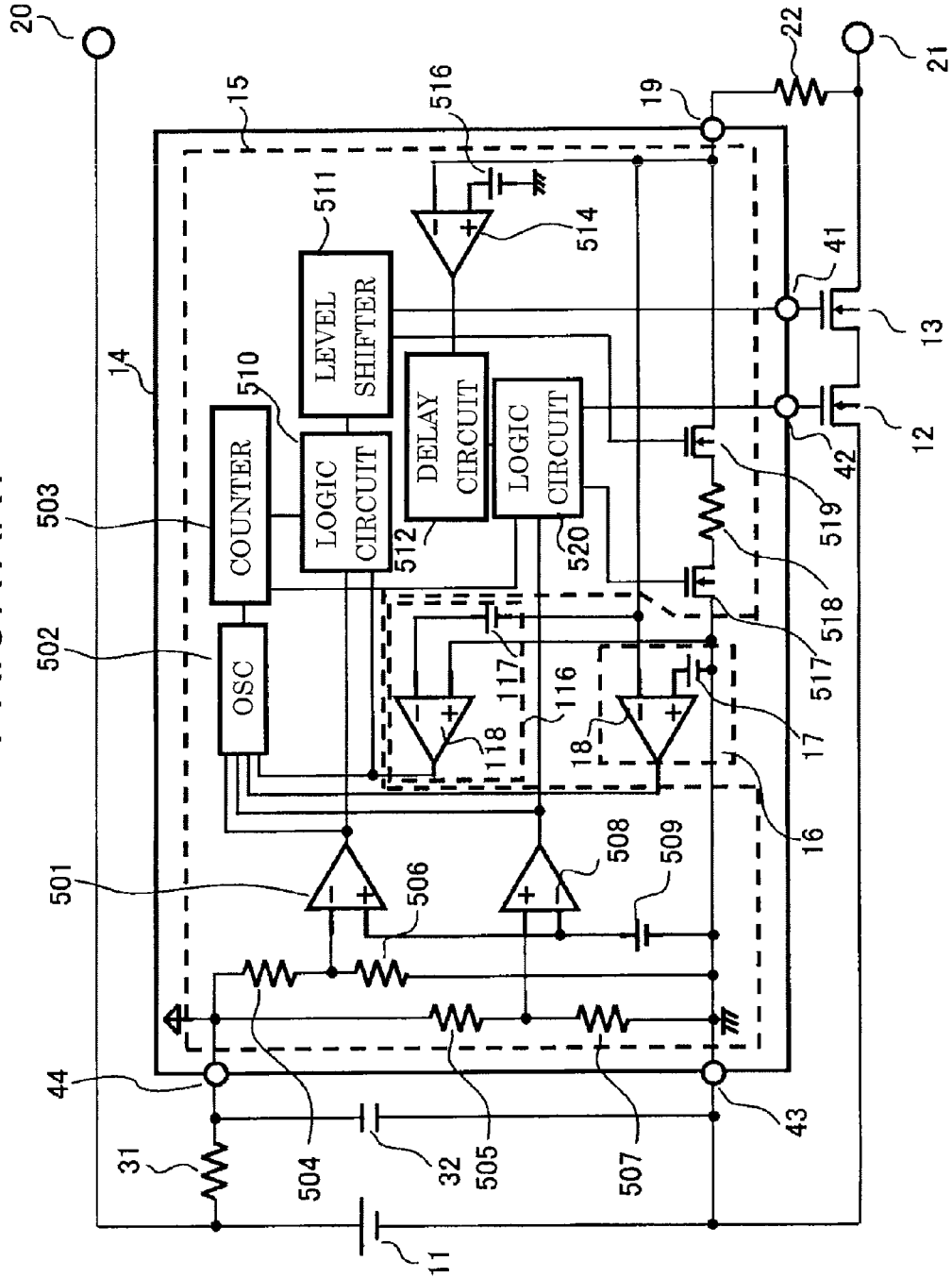
FIG. 3 is a circuit diagram of a related-art battery device.

FIG. 2 is a circuit diagram of a battery device according to a second embodiment of the present invention. FIG. 2 differs from FIG. 1 in that the N-channel discharge control field effect transistor 12 and the N-channel charge control field effect transistor 13 are changed to a P-channel discharge control field effect transistor 212 and a P-channel charge control field effect transistor 213.

Connections are described. The secondary battery 11 has a negative electrode connected to the external terminal 21 and the resistor 31, and a positive electrode connected to the capacitor 32, the positive power supply terminal 44, and a source and a back gate of the P-channel discharge control field effect transistor 212. The negative power supply terminal 43 is connected to a node between the resistor 31 and the capacitor 32. The P-channel discharge control field effect transistor 212 has a gate connected to the discharge control signal output terminal 42, and a drain connected to a node between a drain of the P-channel charge control field effect transistor 213 and one terminal of the resistor 23. The other terminal of the resistor 23 is connected to the overcurrent detection terminal 19. The P-channel charge control field effect transistor 213 has a gate connected to the charge control signal output terminal 41, and a source and a back gate connected to the external terminal 20. The comparator circuit 18 has an inverting input terminal connected to one terminal of the reference voltage circuit 17, a non-inverting input terminal connected to the overcurrent detection terminal 19, and an output terminal connected to the control circuit 15. The other terminal of the reference voltage circuit 17 is connected to the positive power supply terminal 44. The comparator circuit 118 has a non-inverting input terminal connected to one terminal of the reference voltage circuit 117, an inverting input terminal connected to the overcurrent detection terminal 19, and an output terminal connected to the control circuit 15. The other terminal of the reference voltage circuit 117 is connected to the positive power supply terminal 44. The control circuit 15 has a first input terminal connected to the positive power supply terminal 44, a second input terminal connected to the negative power supply terminal 43, a first output connected to the charge control signal output terminal 41, and a second output connected to the discharge control signal output terminal 42.

Next, an operation of the battery device according to the second embodiment of the present invention is described. When a voltage of the secondary battery 11 is equal to or lower than an overcharge detection voltage and equal to or higher than an overdischarge detection voltage, the P-channel discharge control field effect transistor 212 and the P-channel charge control field effect transistor 213 are controlled to be turned on. Under this state, when a load is connected between the external terminals 20 and 21, and a discharge current flows therethrough, a voltage is generated between the positive electrode of the secondary battery 11 and the drain terminal of the P-channel discharge control field effect transistor 212, and is input to the overcurrent detection terminal 19. This voltage is determined by a current amount $I_1$ of the current flowing between the external terminals 20 and 21 and an ON-resistance value $R_{212}$ of the P-channel discharge control field effect transistor 212, and is expressed by $I_1 R_{212}$. When the voltage $I_1 \times R_{212}$ input to the overcurrent detection terminal 19 falls below an output voltage of the reference voltage circuit 17, the discharge overcurrent detection circuit 16 inverts its output and outputs a discharge overcurrent detection signal to the control circuit 15. The control circuit 15 outputs a signal for turning off the P-channel discharge control field effect transistor 212 to the discharge control signal output terminal 42, thereby protecting the battery device from a discharge overcurrent.

When a charger is connected between the external terminals 20 and 21, a charge current $I_2$ flows in the direction reverse to that when the load is connected, and a voltage expressed by $I_2 \times R_{212}$ is input to the overcurrent detection terminal 19. When $I_2 \times R_{212}$ exceeds an output voltage of the reference voltage circuit 117, the charge overcurrent detection circuit 116 inverts its output and outputs a charge overcurrent detection signal to the control circuit 15. The control circuit 15 outputs a signal for turning off the P-channel charge control field effect transistor 213 to the charge control signal output terminal 41, thereby protecting the battery device from a charge overcurrent.

The voltage to be input to the overcurrent detection terminal 19 when the load is connected is determined only by the current amount $I_1$ of the current flowing between the external terminals 20 and 21 and the ON-resistance value $R_{212}$ of the P-channel discharge control field effect transistor 212. Thus, even when a potential difference between the positive power supply terminal 44 and the overcurrent detection terminal 19 is small, the overcurrent can be detected. Because the potential difference necessary for detecting the discharge overcurrent is small, the discharge overcurrent detection circuit 16 can be designed to have a low minimum operating voltage. In this manner, even when the battery voltage decreases due to an internal resistance of the battery at the time of the discharge overcurrent detection, the discharge overcurrent detection circuit 16 can be operated normally to enhance the safety of the battery device.

Further, both the discharge overcurrent detection and the charge overcurrent detection can be performed without using the ON-resistance of the P-channel charge control field effect transistor 213, and hence the flow of the overcurrent has no effect on fluctuations of the ON-resistance of the P-channel charge control field effect transistor 213. Consequently, the overcurrent can be detected with high accuracy.

Note that, the description has been given by using the configuration in which the overcurrent is detected by connecting the resistor to the drains of the P-channel charge control field effect transistor 213 and the P-channel discharge control field effect transistor 212. However, the present invention is not limited to this configuration, and may employ any configuration as long as the overcurrent can be detected from the drain of the P-channel discharge control field effect transistor 212.

As described above, the overcurrent is detected only by the ON-resistance of the P-channel discharge control field effect transistor 212, and hence the minimum operating voltage of the discharge overcurrent detection circuit 16 can be set to be low, and, even when the battery voltage decreases due to the internal resistance of the battery at the time of the discharge overcurrent detection, a malfunction of the discharge overcurrent detection circuit 16 can be prevented to enhance the safety of the battery device. Further, the ON-resistance of the P-channel charge control field effect transistor 213 is not used, and hence the flow of the overcurrent has no effect on fluctuations of the ON-resistance of the P-channel charge control field effect transistor 213. Consequently, the overcurrent can be detected with high accuracy.

What is claimed is:

1. A battery device comprising:
   a first external terminal and a second external terminal;
   a secondary battery connected between the first external terminal and the second external terminal;
   a discharge control switch and a charge control switch between the secondary battery and the second external terminal; and
   a battery state monitoring circuit comprising a first power supply terminal, a second power supply terminal, a discharge control terminal, a charge control terminal, and an overcurrent detection terminal, a discharge overcurrent detection circuit and a charge overcurrent detection circuit, the first power supply terminal and the second power supply terminal connected to both terminals of the secondary battery, the discharge control terminal connected to the discharge control switch, the charge control terminal connected to the charge control switch, the overcurrent detection terminal connected to a node between the discharge control switch and the charge control switch via a resistor, wherein the overcurrent detection terminal is directly connected to the discharge and charge overcurrent detection circuits.

* * * * *